(12) United States Patent
Salowitz et al.

(10) Patent No.: US 11,573,094 B2
(45) Date of Patent: *Feb. 7, 2023

(54) TRANSLATION OF VERBAL DIRECTIONS INTO A LIST OF MANEUVERS

(71) Applicant: Microsoft Technology Licensing, LLC, Redmond, WA (US)

(72) Inventors: Elizabeth P. Salowitz, Seattle, WA (US); David Grochocki, Jr., Seattle, WA (US); Jeff West, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,969

(22) Filed: Oct. 20, 2021

(65) Prior Publication Data

US 2022/0042815 A1 Feb. 10, 2022

Related U.S. Application Data

(63) Continuation of application No. 16/196,612, filed on Nov. 20, 2018, now Pat. No. 11,175,154, which is a continuation of application No. 15/256,834, filed on Sep. 6, 2016, now Pat. No. 10,175,060.

(51) Int. Cl.
  G01C 21/36 (2006.01)
  G06F 40/30 (2020.01)

(52) U.S. Cl.
  CPC .......... *G01C 21/3608* (2013.01); *G06F 40/30* (2020.01)

(58) Field of Classification Search
  CPC .. G01C 21/3608; G06F 40/30; G05D 1/0212; G05D 1/0261; G01S 5/14; G01S 5/30; G01S 5/0284; G01S 2205/01; G01S 5/02; G01S 5/0247; G01S 5/06; H04W 4/025; H04W 4/023; H04W 64/00
  See application file for complete search history.

(56) References Cited

U.S. PATENT DOCUMENTS

| | | | | |
|---|---|---|---|---|
| 6,598,018 B1 * | 7/2003 | Junqua | ................... | G10L 15/22 704/E15.04 |
| 2014/0136013 A1 * | 5/2014 | Wolverton | ............. | B60K 37/06 701/1 |
| 2015/0142704 A1 * | 5/2015 | London | .................. | G06Q 10/10 706/11 |

* cited by examiner

*Primary Examiner* — Nicholas Kiswanto
*Assistant Examiner* — Renee LaRose
(74) *Attorney, Agent, or Firm* — Christopher J. Volkmann; Kelly, Holt & Christenson, PLLC

(57) ABSTRACT

Natural language directions are received and a set of maneuver/context pairs are generated based upon the natural language directions. The set of maneuver/context pairs are provided to a routing engine to obtain route information based upon the set of maneuver/context pairs. The route information is provided to an output system for surfacing to a user.

20 Claims, 8 Drawing Sheets

TRANSLATION OF VERBAL DIRECTIONS INTO A LIST OF MANEUVERS

CROSS-REFERENCE TO RELATED APPLICATIONS

The present application is a continuation of and claims priority of U.S. patent application Ser. No. 16/196,612, filed Nov. 20, 2018, which is a continuation of and claims priority of U.S. patent application Ser. No. 15/256,834, filed Sep. 6, 2016, the contents of which are hereby incorporated by reference in their entirety.

BACKGROUND

Computer systems are currently in wide use. Some such computer systems include mapping systems. Mapping systems often allow a user to provide a start location and a destination, and the mapping system then calculates a route between those two geographic locations. The mapping system can also output a turn-by-turn list of maneuvers for traveling between the start location and the destination.

Sometimes, however, human beings convey directions or route information to one another using natural language. The directions or route information may be in colloquial terms which may be relatively imprecise. Therefore, a computing system may not be able to easily determine a route from the natural language directions or route information.

In addition, a human being may know a best route to take (e.g., one that is better than a route automatically generated by a mapping system). However, it can be difficult to convey that route to another human being. This is sometimes done, currently, by obtaining a default route from a mapping system and then providing user inputs to drag the default route provided by the mapping system so that it conforms to the best route known by the user. It can also be done by adding artificial waypoints to force the mapping system to output the route desired by the user.

The discussion above is merely provided for general background information and is not intended to be used as an aid in determining the scope of the claimed subject matter.

SUMMARY

Natural language instructions are received and a set of maneuver/context pairs are generated based upon the natural language instructions. The set of maneuver/context pairs are provided to a routing engine to obtain route information based upon the set of maneuver/context pairs. The route information is provided to an output system for surfacing to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
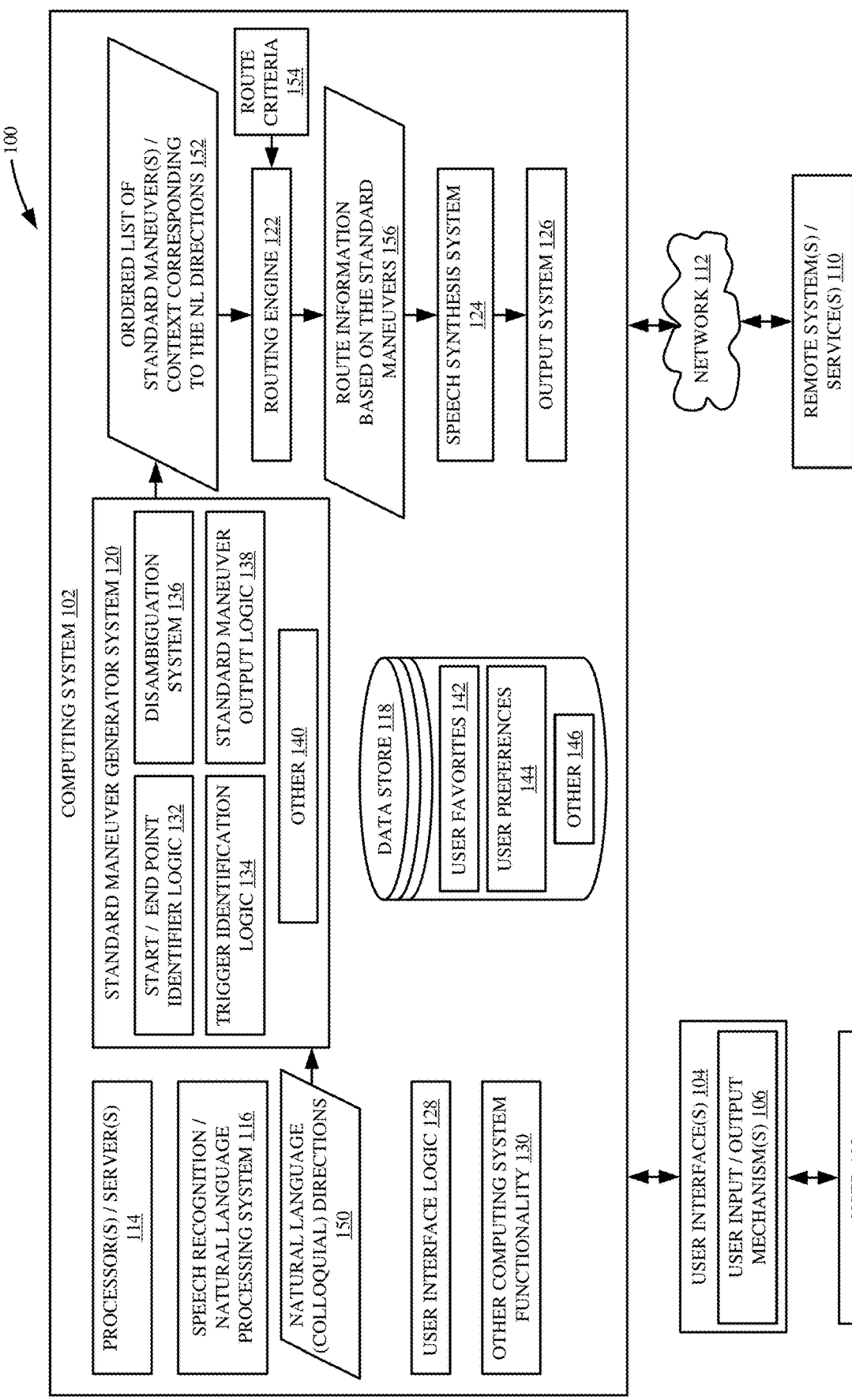
FIG. 1 is a block diagram of one example of a computing system architecture.

FIG. 1 is a block diagram of one example of a computing system architecture 100. Architecture 100 includes computing system 102 that generates user interfaces 104 with user input/output mechanisms 106 for interaction by user 108. User 108 can interact with the user input/output mechanisms 106 in order to control and manipulate computing system 102. FIG. 1 also shows that, in architecture 100, computing system 102 can be coupled to access remote systems or services 110 using network 112. Network 112 can be any of a variety of different types of networks, such as a wide area network, a local area network, a cellular network, a near field communication network, among others.

In the example shown in FIG. 1, computing system 102 illustratively includes one or more processors or servers 114, speech recognition/natural language processing system 116, data store 118, standard maneuver generator system 120, routing engine 122, speech synthesis system 124, output system 126, user interface logic 128, and it can include a variety of other computing system functionality 130. Standard maneuver generator system 120, itself, illustratively includes start/end point identifier logic 132, trigger identification logic 134, disambiguation system 136, standard maneuver output logic 138, and it can include other items 140. Data store 118 can, itself, include user-specific location information, such as information identifying user favorites 142, user preferences 144, and a wide variety of other items 146. Before describing the overall operation of computing system 102 in more detail, a brief overview of some of the items in architecture 100, and their operation, will first be provided.

Speech recognition/natural language processing system 116 can be located on computing system 102 or remotely from computing system 102 and accessed by computing system 102. In one example, system 116 illustratively receives a natural language input, which can be a speech input, a written textual input, etc. If it is a speech input, the speech is recognized by the speech recognition portion of system 116 so that words (or other linguistic units) in the speech input are identified. The natural language processing portion of system 116 then performs natural language processing on those linguistic units (or on linguistic units in a natural language input that is provided in textual form) to identify a semantic meaning, or linguistic meaning, of the units. These are provided as natural language directions 150, to standard maneuver generator system 120.

Trigger identification logic 134 then identifies a set of maneuver/context pairs. These pairs can be referred to as triggers. The maneuver/context pairs can also include limiters as well. For example, the natural language directions 150 may be "stay on Pine Street until you get to the coffee shop, and then turn left onto Broadway." Trigger identification logic 134 may identify, in that input, a maneuver such as "turn [direction]", where the direction is "left". It may also identify context information which indicates a location where the left turn is to be taken. In this example, the context information may be "at the coffee shop, onto Broadway". Disambiguation system 136 then uses other context information in the natural language directions 150 to identify which coffee shop (or a geographic location of the coffee shop) the user is referring to. For instance, disambiguation system 136 may identify a coffee shop at the intersection of Pine Street and Broadway as "ACME Coffee Shop". Thus, trigger identification logic 134 may generate, as a maneuver/context pair, "turn left onto Broadway at the ACME Coffee Shop located at 123 Pine Street".

In one example, trigger identification logic 134 can also identify limiters. For instance, if the natural language direction 150 also included the directions "if you reach the fast food restaurant, you've gone too far". In that case, disambiguation system 136 identifies the particular "fast food restaurant" (or its geographic location) given other context information, and trigger identification logic 134 can generate the maneuver/context pair, including a limiter, as a trigger.

It will also be noted, in one example, start/end point identifier logic 132 may identify a start point and a destination, based upon the natural language directions 150, which may be relatively imprecise with respect to those locations. For instance, it may be that natural language directions 150 begin with a text string such as "get on 520 heading East". In that case, start/end point identifier logic 132 identifies an origin, such as the user's current location, and identifies maneuver/context pairs that take the user from the identified origin to "the 520".

The trigger identification logic 134 can then generate triggers, including the maneuver/context pairs from the origin along with any limiters, and provide them to standard maneuver output logic 138. Logic 138 illustratively outputs a sequentially ordered list of triggers (comprising standard maneuvers corresponding to the natural language directions 150) in the form of the maneuver/context (and possibly limiter) pairs. This is indicated by block 152 in FIG. 1.

These are provided to routing engine 122 which takes the sequential triggers (e.g., the sequential maneuver/context pairs) as start and end points and then calculates a route between those two points. It can do this using route criteria 154 to identify the particular route. The route criteria may include such things as "shortest distance", "use main roads", "add as few additional waypoints as possible", etc. In one example, routing engine 122 calculates the route to conform as closely as possible, given the route criteria 154, to the route represented by the ordered list of triggers 152. It outputs route information 156 indicative of the route represented by triggers 152. Thus, the route information 156 conforms closely to the natural language directions 150 received by system 120. In this way, it is contemplated that the user that provided the natural language directions 150 may know a best route for another user to take. Thus, system 102 calculates route information 156 to conform to the natural language directions 150 provided, initially, by the user.

In one example, speech synthesis system 124 can be used to generate an audible, verbal output that represents the route information 156. This output may provide instructions or directions to the user in order to navigate the route. It will be noted that the verbal output can take a variety of different forms. It can be part of an existing navigation system (such as guided directions that tell the user what to do). It can also be generated by taking the corresponding snippet from the original recording that matches the trigger and playing that at the point in the navigation corresponding to that trigger. This way, a user who got the directions from a friend can hear the instructions in their friend's voice.

In another example, the snippets from the original recordings can be interspersed with standard guided navigation recordings. Or, in another example, the verbal instructions include only the snippets from the original recording and the user can rely on the visually displayed directions for portions of the route that lie between the snippets.

The route information (and possibly corresponding speech synthesis information) can be provided to any of a variety of different output systems 126 for surfacing to user 108. In one example, output system 126 is a mapping application which displays the route information 156 as a maneuvers list that user 108 can follow in order to navigate the route. In another example, output system 126 is a guided navigation system that walks the user through each step in the route information 156, to guide the user through navigation of the route. These outputs can be in the form of a display, they can be audible, they can be other outputs or combinations of outputs. In another example, output system 126 can be a local or remote storage system where the route information 156 can be saved and shared.

Figure 2:
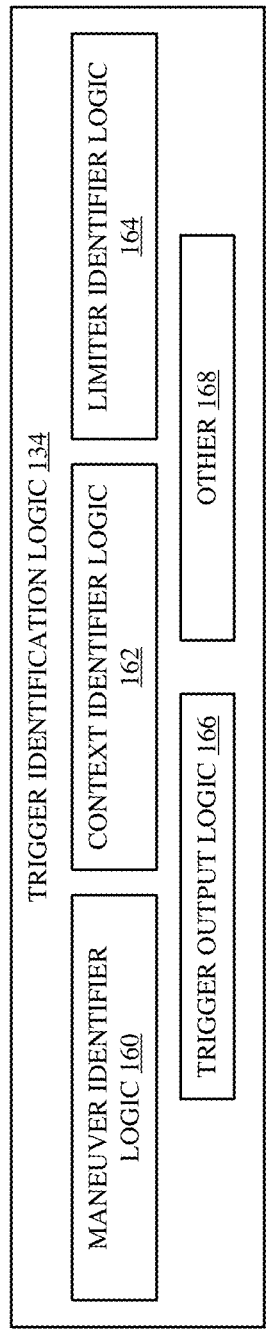
FIG. 2 is a block diagram showing one example of trigger identification logic (shown in FIG. 1) in more detail.

FIG. 2 is a block diagram showing one example of trigger identification logic 134 in more detail. In the example shown in FIG. 2, logic 134 illustratively includes maneuver identifier logic 160, context identifier logic 162, limiter identifier logic 164, trigger output logic 166, and it can include a variety of other items 168. Maneuver identifier logic 160 illustratively parses the natural language directions 150 to match portions of the directions 150 with known navigation maneuvers, such as "turn right on Pine Street". Context identifier logic 162 identifies context information (such as location information) corresponding to each identified maneuver. Limiter identifier logic 164 illustratively identifies any limiters corresponding to the maneuver/context pair identified by logic 160 and 162. Trigger output logic 166 can output a trigger in the form of the maneuver/context pair, along with any limiters identified by logic 164. In one example, logic 160, logic 162, and logic 164 are natural language processing components that identify the standard maneuvers, the context (or location) corresponding to the standard maneuvers and any limiters using natural language processing techniques. They can be rules based systems in which items in natural language directions 150 are matched against rules and matching rules are triggered to identify maneuvers and/or context information, and possibly limiters. Logic 160, 162 and 164 can also be implemented using model-based natural language processing systems, heuristically-based systems, or other systems.

Some examples of the maneuvers that maneuver identifier logic 160 can identify include those set out below in Table 1. These are examples only.

TABLE 1

"Turn" [direction]
"at the" [place | object] {optional: "on the" [direction]}
"After the" [place | object] {optional: "on the" [direction]}
"Pass the" [place | object]
"Before the" [place | object]
"Pretend like you are going to" [place]
place = searchable location (ACME, hotel, gas station, etc.)
object = light | stop sign | fire hydrant | bushes | parking lot The triggers output by trigger output logic 166 can be disambiguated by disambiguation system 136, to the extent needed or desired. They can then be output using logic 138 (shown in FIG. 1) as the ordered list of standard maneuvers and corresponding context information corresponding to the natural language directions 150.

Figure 3:
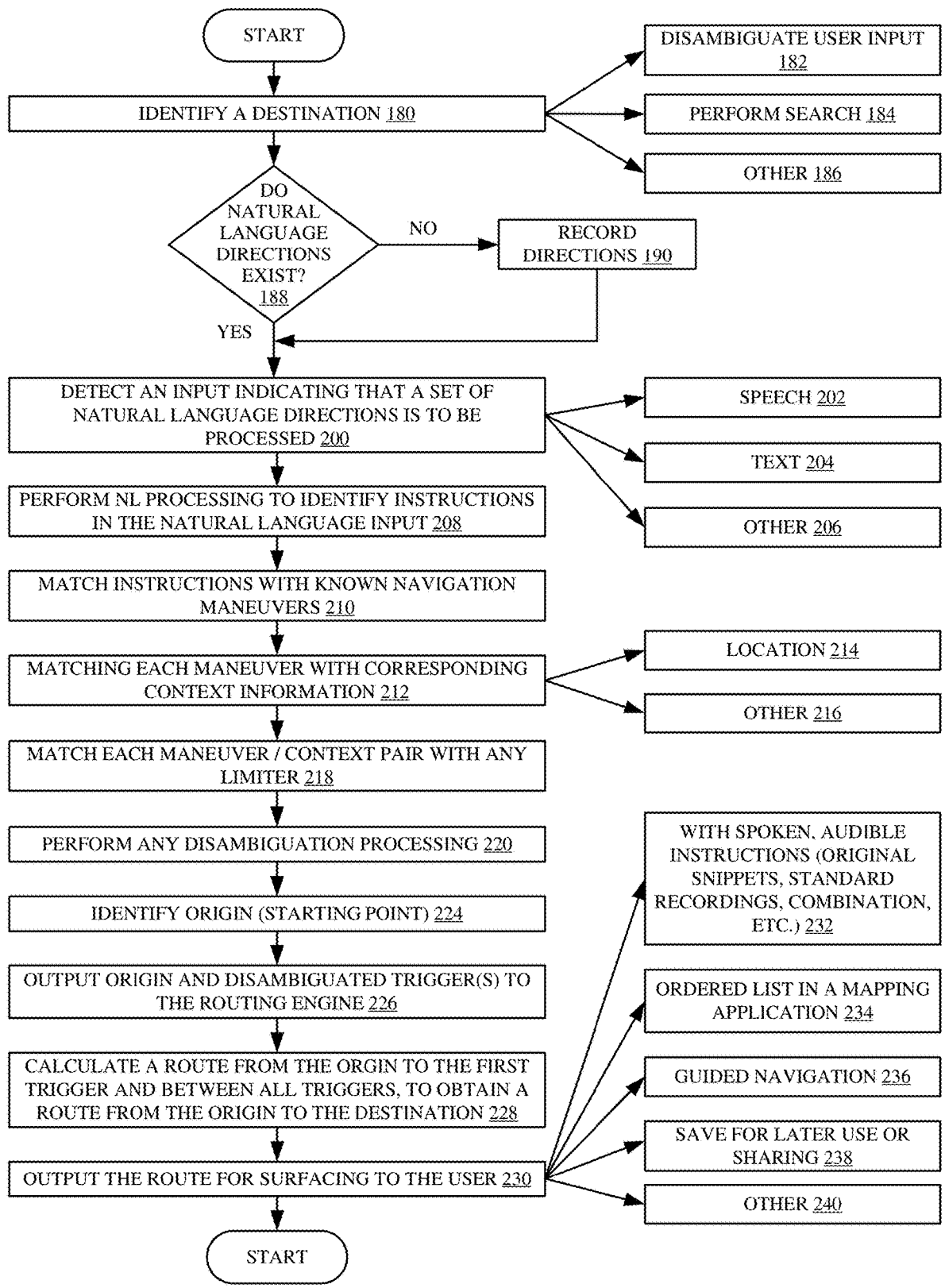
FIG. 3 is a flow diagram illustrating one example of the operation of the architecture shown in FIG. 1 and the trigger identification logic shown in FIG. 2 in generating route information from a set of natural language directions.

FIG. 3 is a flow diagram illustrating one example of the operation of computing system 102 and trigger identifier logic 134, in generating route information based on natural language directions received by the system. In one example, computing system 102 first identifies a destination that is to be used for generating a route. This is indicated by block 180. A user may provide a natural language input such as "Get directions to ACME store in Redmond." Disambiguation system 136 may perform disambiguation to identify which, particular ACME store this is, if needed. This is indicated by block 182. System 116, or another system, may also search for the ACME store location in data store 118 or in another data store or in a remote system or service 110. This is indicated by block 184. The destination can be identified in other ways as well.

Once the destination is identified, if natural language directions already exist from the user's current location to the destination, they can be retrieved for processing. If not, it may be that the user wishes to record directions to the destination (such as for sharing with another user). If that is the case, the user can record the directions such as by using a microphone or other user input or dictation system. This is indicated by blocks 188 and 190.

At some point, system 102 will detect an input indicating that a set of natural language directions 150 is available to be processed. This is indicated by block 200 in the flow diagram of FIG. 3. The input can take a wide variety of different forms. For instance, user 108 can actuate a user input mechanism 106 to indicate this. In another example, it may be that standard maneuver generator system 120 receives an automated indication that a set of natural language directions 150 is to be processed.

It will also be noted that the natural language directions can be in the form of speech 202, text 204, or they can take other forms 206. Where the natural language directions are in the form of speech 202, they may be in the form of recorded or live speech that is being input by user 108. In either case, they are illustratively provided to a speech recognition system 116 that recognizes words in the speech, or may recognize other linguistic units as well. Natural language processing system 116 then performs natural language processing to identify directions in the natural language input. Performing natural language processing to identify directions in the natural language input is indicated by block 208 in the flow diagram of FIG. 3. natural language directions 150 are provided to standard maneuver generator system 120.

Maneuver identifier logic 160 in trigger identification logic 134 then matches the natural language directions with known navigation maneuvers. The set of known navigation maneuvers against which the natural language directions are matched may be accessed in a data store that is used by a routing engine, a mapping system, or other components or logic. Matching the directions with known navigation maneuvers is indicated by block 210 in the flow diagram of FIG. 3.

By way of example, it may be that a natural language input is "make a right". This may be matched by maneuver identification logic 160 to a known maneuver of "turn right". The matching can be performed by using a language model, a context free grammar or other grammar, a rules-based or heuristic-based system, or in other ways.

Context identifier logic 162 then matches each maneuver identified by logic 160 with corresponding context information. This is indicated by block 212. In one example, the corresponding context information is location information 214, indicating a location at which the maneuver is to be performed. However, it can take other forms as well, as indicated by block 216. As an example, it may be that the maneuver is "turn right" and the context information is "at the intersection of Pine Street and Broadway". However, the location information may take other forms. For instance, instead of "at the corner of Pine Street and Broadway", the context information may be "at the next gas station". These are examples only.

Limiter identifier logic 164 then identifies any limiters that go along with the maneuver/context pair and matches the maneuver/context pair with that limiter. This is indicated by block 218 in FIG. 3. By way of example, it may be that the maneuver is "turn right", the context information is "at the gas station", and the limiter is "after the fork in the road".

In this example, the trigger that comprises the maneuver/context pair with its limiter would be "turn right at the gas station after the fork in the road." The various portions of the trigger (maneuver, context, limiter) can be labeled or otherwise marked.

It can be seen that some portions of this may be ambiguous. For example, "the gas station" and "after the fork in the road" may both be ambiguous, and may even be ambiguous when taken together. Therefore, trigger identification logic 134 accesses disambiguation system 136 which performs any disambiguation processing to disambiguate the context information or the limiter, or both. Performing disambiguation is indicated by block 220 in the flow diagram of FIG. 3. The disambiguation system 136 illustratively considers context information from not only the current maneuver/context pair, but also from other maneuver/context pairs that appear before or after the current pair, in the ordered list of triggers. For instance, if the previous maneuver/context pair was "turn right from Pine Street onto Broadway", then the disambiguation system 136 can use that information to determine which particular gas station corresponds to "the next gas station" in the maneuver/context pair being disambiguated. It can access location information for all gas stations on "Broadway" and then identify the first gas station after the traveler has turned right onto Broadway, from Pine Street, and augment the context information to show the particular name of that gas station, if desired. It can also replace or augment the context information and limiter with other identifying information such as geographic location information, address information, or other information.

Start/end point identifier logic 132 then identifies the origin (or starting point) for user 108. This is indicated by block 224 in the flow diagram of FIG. 3.

For instance, if the first natural language direction is "start by getting on 520 at Broadway Street," there may be multiple steps to get from the user's current location to Broadway Street. However, given contextual information about the user's current location (e.g., his or her current GPS location, current home address, etc.) and the location of the closest entry onto Broadway Street, and additional contextual knowledge about the way the user should go to get to the final destination, routing engine 122 can generate turn-by-turn directions to get the user into a position where the natural language directions actually begin.

Trigger output logic 166 then outputs the origin and disambiguated triggers to the routing engine 122. This is indicated by block 226 in FIG. 3. In one example, the ordered list of triggers comprise an ordered list of standard maneuvers and corresponding context information. This is provided as a list of maneuvers that are to be sequentially performed at individual points identified by the context or location information. Routing engine 122 then accesses route criteria 154 and calculates a route from the origin to the location of the first trigger. It then calculates a route between subsequent pairs of sequential triggers. This allows the routing engine to generate a route from the origin to the destination, while conforming the particular directions that were input by the user in natural language form. Thus, routing engine 122 does not simply discard the user's directions and calculate a route form the origin to the destination. Instead, it calculates that route using (or at least taking into account) the various directions that the user input in natural language form. This is because it considers the triggers (e.g., maneuver/context pairs—with any delimiters) in generating the route. Calculating a route from the origin to the first trigger and then between all subsequent pairs of triggers to obtain a route from the origin to the destination, using the user's natural language directions, is indicated by block 228 in FIG. 3.

The route information 156 can then be output by output system 126 for surfacing to user 108. This is indicated by block 230 in the flow diagram of FIG. 3. In one example, speech synthesis system 124 can generate audible directions that accompany the route information 156. In that example, the route information can be displayed as a set of step-by-step directions, but it can also take the form of spoken directions instead, or as well. Outputting the spoken, audible instructions is indicated by block 232.

The route information 156 can also be surfaced as an ordered list of directions in a mapping application. This is indicated by block 234. It can be used in a guided navigation system to allow user 108 to perform a guided navigation. This is indicated by block 236. It can also be saved (such as at data store 118, at a remote system or service 110, or elsewhere) for later use or sharing. This is indicated by block 238. The information can be output in other ways as well, and this is indicated by block 240.

It can thus be seen that the present system provides a number of significant advantages. It matches verbal strings in a recording, a live audio stream, or even a phone/VOIP call to standard navigation/maneuver terms. It also recognizes locations in verbal instructions, and maps them to physical locations. For example, where an instruction is to turn at the coffee shop onto "Greenlake Avenue", but there are multiple Greenlake Avenues, the present system disambiguates that term to find the correct Greenlake Avenue, given that the original location and destination are both in a particular city. It can also identify the correct coffee shop to turn at, given that the previous direction was to "turn on Pine Street". Further, a particular road (such as State Highway WA-520) may be colloquially referred to by a short name (such as "520" or "the 520"). The present system recognizes that, given the surrounding context information.

The present system can also disambiguate specific locations, again based on secondary information or the context information or limiters in other triggers. It can also identify or disambiguate attributes of a road by relating it to mapping data. For instance, the term "the large bend in the road" or "after the fork" may be used when a physical location is not the best indicator of when a maneuver should take place.

The triggers use a maneuver (e.g., "turn right") within a context (such as "at a location" "or" "at the next gas station", etc.) to compose a maneuver with a map location. This is illustratively done by searching for map locations with the given name (e.g., the name of the gas station) along the street the user is on, or by interpolating other nearby options based upon the computer-generated route information.

The limiters provide a bound on directions to reduce the need to disambiguate vague or incomplete triggers. For instance, assume that the trigger is "turn right at the gas station", and includes the limiter "if you have reached the grocery store, you have gone too far." This type of limiter provides additional context to the standard maneuver generator system 120 to limit the need for additional user input. Limiters can also indicate a minimum or maximum distance or time to travel (e.g., "drive for about 10 minutes" or "head down that road for a couple miles"). These are used to reduce any need for additional user inputs as well.

The present system also uses routing engine 122 to provide directions that may be used to fill gaps in the verbal directions. For instance, if the initial direction is "start by getting on 520 at Montlake", there may be multiple steps to get from the user's current location to the Montlake entrance. However, given the user's home address and the location of the Montlake entrance ramp, and contextual knowledge about which way the user should go to get to the final destination, the routing engine 122 can use the start point identified by start/end point identifier logic 132 to fill in the gaps to get turn-by-turn directions from the user's current location to the first identified location in the directions (the entrance ramp to 520 at Montlake).

The same type of processing can be used to fill in gaps in the middle of the route. For instance, if the natural language direction is "pretend like you're driving from Seattle to work, but keep going on 520 until you get to the exit you'd use to go to the Target in Redmond", the triggers that are generated and provided to routing engine 122 allow routing engine 122 to translate this into turn-by-turn directions, first from the user to their work, but instead of getting off at 520 to go to work, that location is used as a waypoint. Engine 122 then gets directions from that waypoint (on 520) to the nearest Acme Store in Redmond.

All of these greatly enhance the operation of the computing system and greatly reduce the need for additional user input. It also allows the system to follow the directions provided by the user in the natural language instructions, and not to simply calculate its own route. Instead, the route that is generated conforms to the route input by the user is used.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
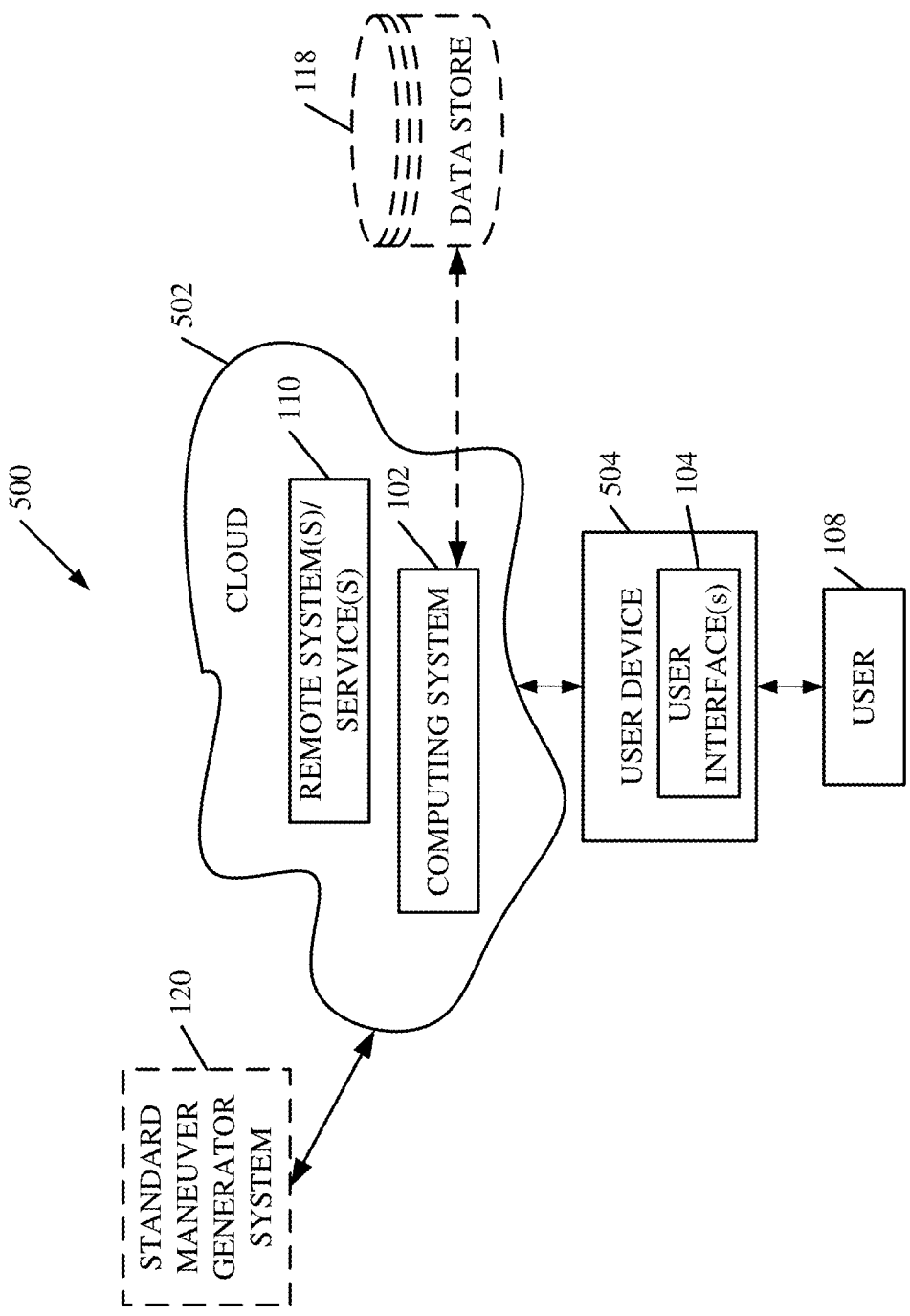
FIG. 4 is a block diagram of one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 can be located in cloud 502 (which can be public, private, or a combination where portions are public while others are private). Therefore, user 108 uses a user device 504 to access those systems through cloud 502.

FIG. 4 also depicts another example of a cloud architecture. FIG. 4 shows that it is also contemplated that some elements of computing system 102 can be disposed in cloud 502 while others are not. By way of example, data store 118 can be disposed outside of cloud 502, and accessed through cloud 502. In another example, standard maneuver generator system 120 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
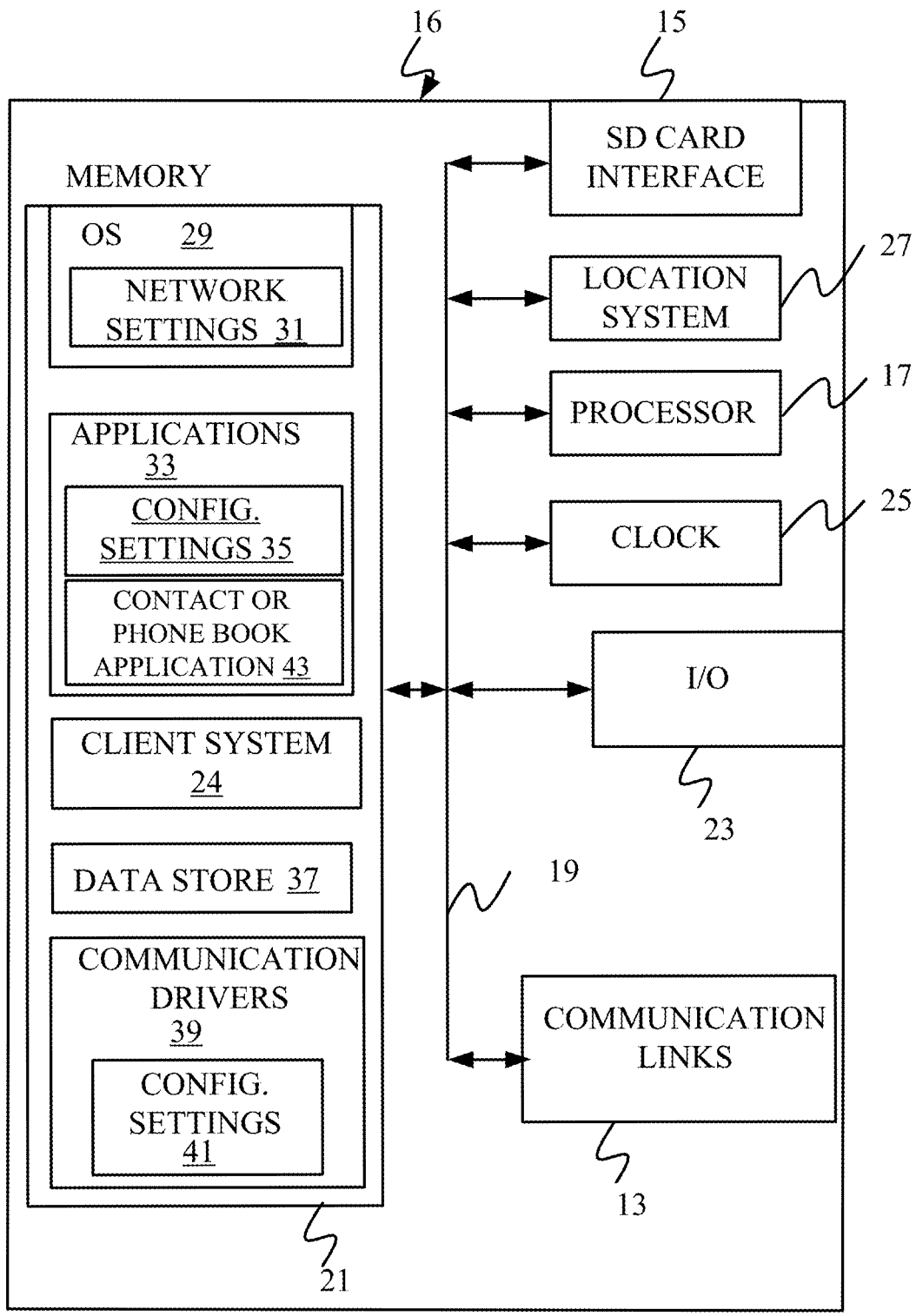
FIGS. 5-7 show examples of mobile devices that can be used in the architectures shown in the previous figures.
Figure 6:
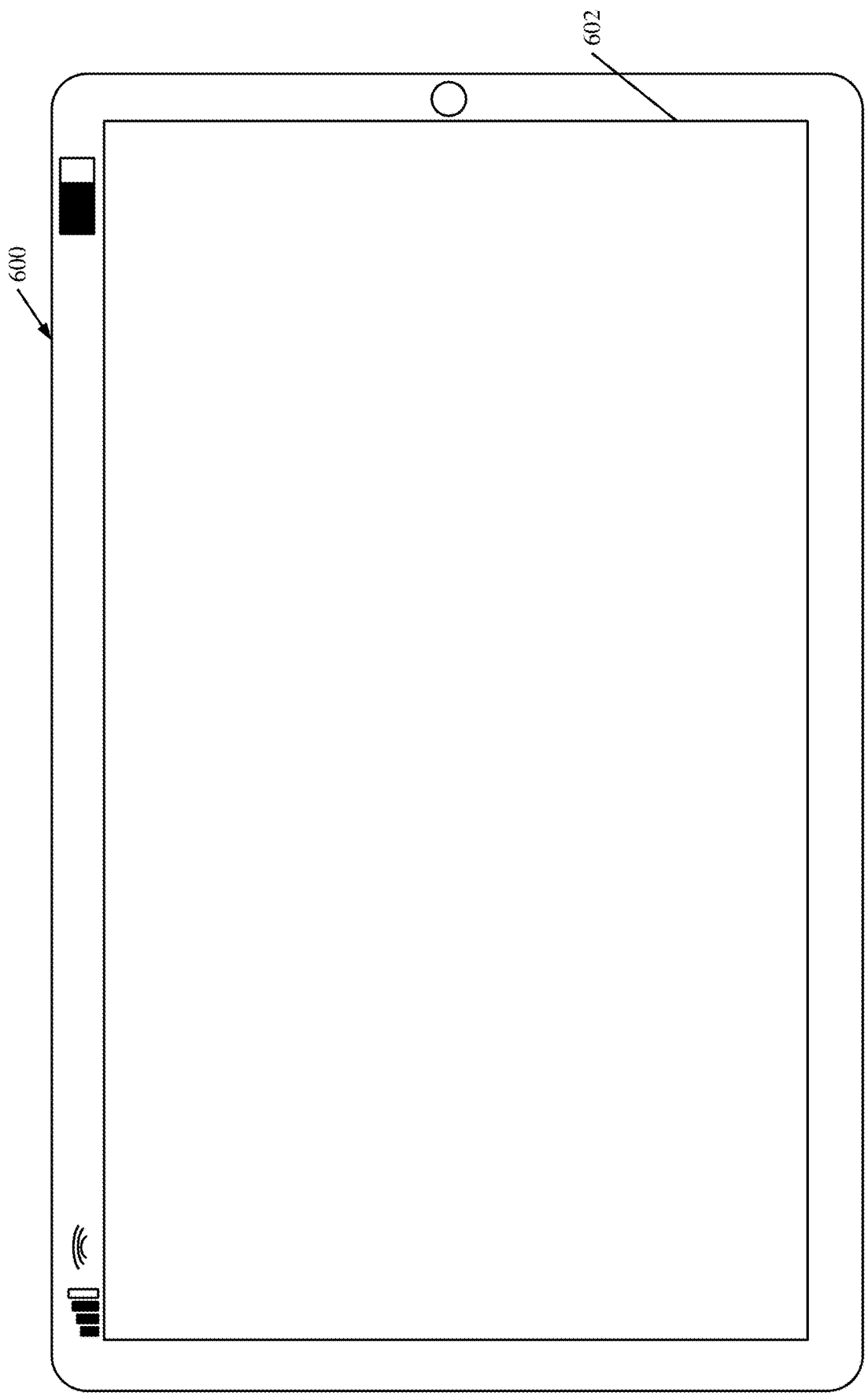
Figure 7:
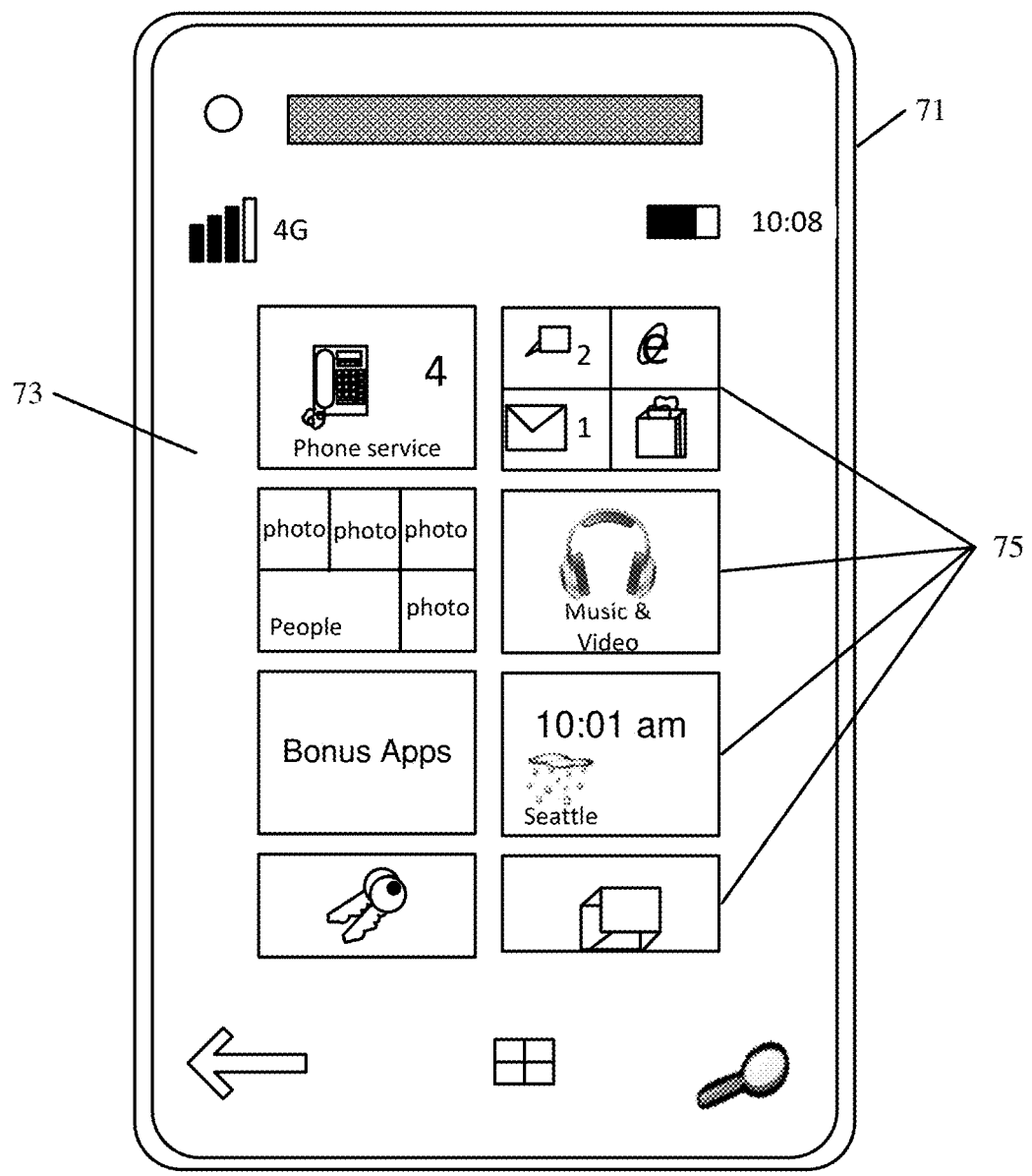
Figure 8:
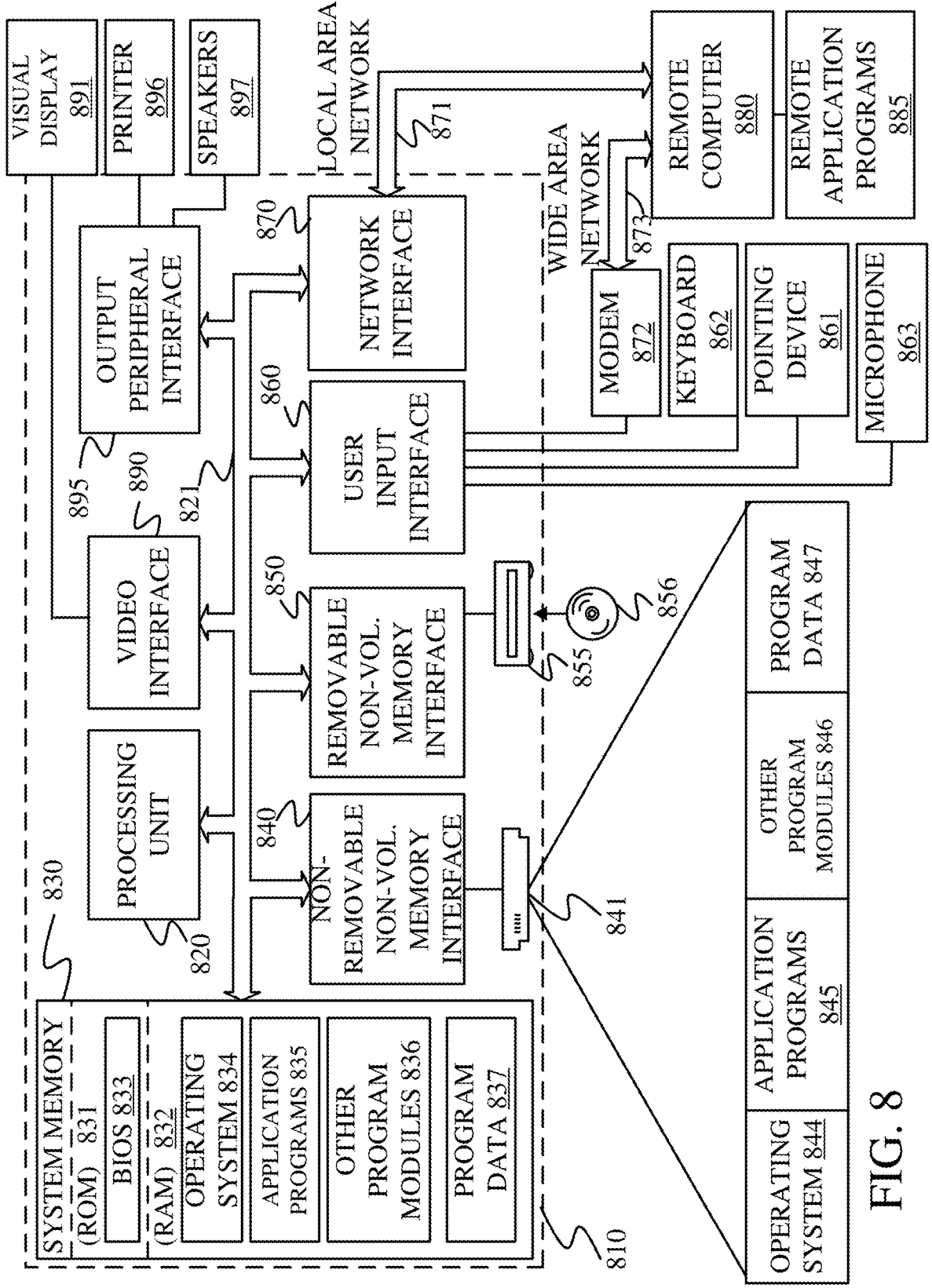
FIG. 8 is a block diagram of one example of a computing environment that can be used in the architectures shown in the previous figures.

FIG. 5 is a simplified block diagram of one illustrative example of a handheld or mobile computing device that can be used as a user's or client's hand held device 16, in which the present system (or parts of it) can be deployed. FIGS. 6-8 are examples of handheld or mobile devices.

FIG. 5 provides a general block diagram of the components of a client device 16 that can run components of computing system 102 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 114 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16.

This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8 provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
maneuver identification logic that receives a natural language instruction and matches it with a pre-defined navigation maneuver;
context identifier logic that identifies context information corresponding to the pre-defined navigation maneuver, the context information being indicative of a location at which the pre-defined navigation maneuver is performed;
trigger output logic that outputs, as a trigger, the pre-defined navigation maneuver and the corresponding context information; and
an output system that surfaces the trigger.

Example 2 is the computing system of any or all previous examples and further comprising:
limiter identifier logic that identifies any geographic limiter in the natural language instruction, the trigger output logic being configured to output the geographic limiter, along with the pre-defined navigation maneuver and the corresponding context information, as the trigger.

Example 3 is the computing system of any or all previous examples and further comprising:
a disambiguation system that performs disambiguation of the context information and the geographic limiter to identify geographic locations corresponding to the context information and the geographic limiter.

Example 4 is the computing system of any or all previous examples and further comprising:
a routing engine that identifies a route based on a first point and a second point.

Example 5 is the computing system of any or all previous examples wherein the maneuver identification logic is configured to receive a plurality of natural language instructions and match each with a pre-defined navigation maneuver, the context identifier logic being configured to identify context information corresponding to each of the pre-defined navigation maneuvers, the trigger output logic being configured to output, as a set of ordered triggers, a set of pre-defined navigation maneuvers and corresponding context information provided by the maneuver identification logic and the context identifier logic.

Example 6 is the computing system of any or all previous examples wherein the routing engine is configured to receive the set of ordered triggers and generate route information identifying a route between successive pairs of triggers in the set of ordered triggers.

Example 7 is the computing system of any or all previous examples and further comprising:
start point identifier logic that identifies a start point from the plurality of natural language instructions and from user-specific location information.

Example 8 is the computing system of any or all previous examples wherein the routing engine is configured to generate route information identifying a route from the start point to a first of the set of ordered triggers.

Example 9 is the computing system of any or all previous examples and further comprising:
a speech system that generates navigation speech corresponding to the routing information and outputs the navigation speech.

Example 10 is the computing system of any or all previous examples wherein the output system surfaces the routing information on a navigation display as a set of turn-by-turn navigation instructions and the navigation speech on an audio output device as a set of spoken navigation instructions.

Example 11 is the computer system of any or all previous examples wherein the plurality of natural language instructions are speech instructions and wherein the speech system generates the navigation speech by matching the speech instructions in the natural language instructions with the corresponding trigger.

Example 12 is the computing system of any or all previous examples wherein the speech system generates at least some of the speech instructions as pre-existing, spoken navigation instructions.

Example 13 is a computer implemented method, comprising:

receiving a natural language instruction;

matching the natural language instruction with a pre-defined navigation maneuver;

identifying context information corresponding to the pre-defined navigation maneuver, the context information being indicative of a location at which the pre-defined navigation maneuver is performed;

generating a trigger comprising the pre-defined navigation maneuver and the corresponding context information; and surfacing the trigger.

Example 14 is the computer implemented method of any or all previous examples and further comprising:

identifying any geographic limiter in the natural language instruction; and generating the trigger to include the geographic limiter, along with the pre-defined navigation maneuver and the corresponding context information.

Example 15 is the computer implemented method of any or all previous examples and further comprising:

performing disambiguation of the context information and the geographic limiter to identify geographic locations corresponding to the context information and the geographic limiter.

Example 16 is the computer implemented method of any or all previous examples wherein matching comprises matching each of a plurality of natural language instructions with a pre-defined navigation maneuver, wherein identifying context information comprises identifying context information corresponding to each of the pre-defined navigation maneuvers, and wherein generating the trigger generating, as a set of ordered triggers, a set of pairs of the pre-defined navigation maneuvers and corresponding context information, and further comprising:

generating route information identifying a route between successive pairs of triggers in the set of ordered triggers.

Example 17 is the computer implemented method of any or all previous examples and further comprising:

identifying a start point from the plurality of natural language instructions and from user-specific location information.

Example 18 is the computer implemented method of any or all previous examples wherein generating route information comprises:

generating route information identifying a route from the start point to a first of the set of ordered triggers.

Example 19 is the computer implemented method of any or all previous examples and further comprising:

generating navigation speech corresponding to the routing information; and surfacing the routing information on a navigation display as a set of turn-by-turn navigation instructions and the navigation speech on an audio output device as a set of spoken navigation instructions.

Example 20 is a computing system, comprising:

maneuver identification logic that receives a plurality of natural language instructions and matches each with a pre-defined navigation maneuver;

context identifier logic that identifies context information corresponding to each of the pre-defined navigation maneuvers, the context information being indicative of a location at which the corresponding pre-defined navigation maneuver is performed;

trigger output logic that outputs, as a set of ordered triggers, a set of pre-defined navigation maneuvers and corresponding context information provided by the maneuver identification logic and the context identifier logic; and an output system that surfaces the set of ordered triggers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system, the method comprising:

receiving a natural language input;

generating one or more natural language instructions based on identifying linguistic units in the natural language input and performing natural language processing on the linguistic units;

identifying, based on the one or more natural language instructions, an end point for a route and a trigger that comprises a navigation maneuver and corresponding context information, the corresponding context information being indicative of a location corresponding to performance of the navigation maneuver;

generating route information that represents a portion of the route that includes the trigger and the end point; and rendering the route information.

2. The method of claim 1, wherein performing natural language processing on the linguistic units comprises identifying semantic meaning of the linguistic units.

3. The method of claim 1, and further comprising identifying, based on the natural language input, a plurality of natural language instructions.

4. The method of claim 3, wherein the plurality of natural language instructions are indicative of a sequential set of navigation maneuvers to be performed along the route, and the location comprises a waypoint along the route.

5. The method of claim 1, wherein the trigger comprises a first trigger, and further comprising:

identifying, based on the one or more natural language instructions, an ordered set of triggers comprising the first trigger and a second trigger; and generating route information representing a portion of the route between the first and second triggers.

6. The method of claim 1, and further comprising:

identifying a geographic limiter in the one or more natural language instructions; and generating the trigger to include the geographic limiter, along with the navigation maneuver and the corresponding context information.

7. The method of claim 1, and further comprising:
performing disambiguation of the context information and the geographic limiter to identify a geographic location corresponding to the context information and the geographic limiter.

8. The method of claim 1, and further comprising:
identifying a plurality of natural language instructions, each indicative of a different navigation maneuver to be performed along the route;
matching each of the plurality of natural language instructions with a pre-defined navigation maneuver;
identifying context information corresponding to each of the pre-defined navigation maneuvers;
generating, as a set of ordered triggers, a set of pairs of the pre-defined navigation maneuvers and corresponding context information; and
generating route information that identifies a portion of the route between successive pairs of triggers in the set of ordered triggers.

9. The method of claim 1, and further comprising:
rendering the route information as a set of turn-by-turn navigation instructions.

10. The method of claim 9, wherein the natural language input comprises a textual user input.

11. The method of claim 9, wherein the natural language input comprises a speech user input.

12. The method of claim 11, wherein rendering comprises:
rendering a portion of the speech input in association with the turn-by-turn navigation instructions.

13. The method of claim 12, wherein rendering a portion of the speech input comprises:
obtaining a snippet from the speech input; and
audibly rendering the snippet to the user in association with a corresponding navigation instruction in the set of turn-by-turn navigation instructions.

14. A computing system, comprising:
a processor; and
memory storing instructions executable the processor, wherein the instructions, when executed, cause the computing system to:
receive a natural language input;
generate one or more natural language instructions based on identifying linguistic units in the natural language input and performing natural language processing on the linguistic units;
identify, based on the one or more natural language instructions, an end point for a route and a trigger that comprises a navigation maneuver and corresponding context information, the corresponding context information being indicative of a location corresponding to performance of the navigation maneuver;
generate route information that represents a portion of the route that includes the trigger and the end point; and
render the route information.

15. The computing system of claim 14, wherein the one or more natural language instructions are indicative of a sequential set of navigation maneuvers to be performed along the route, and the location comprises a waypoint along the route.

16. The computing system of claim 14, wherein the trigger comprises a first trigger, and the instructions, when executed, cause the computing system to:
identify, based on the one or more natural language instructions, an ordered set of triggers comprising the first trigger and a second trigger; and
generate route information representing a portion of the route between the first and second triggers.

17. The computing system of claim 14, wherein the instructions, when executed, cause the computing system to:
identify a geographic limiter in the one or more natural language instructions; and
generate the trigger to include the geographic limiter, along with the navigation maneuver and the corresponding context information.

18. The computing system of claim 14, wherein the instructions, when executed, cause the computing system to:
identify a plurality of natural language instructions, each indicative of a different navigation maneuver to be performed along the route;
match each of the plurality of natural language instructions with a pre-defined navigation maneuver;
identify context information corresponding to each of the pre-defined navigation maneuvers;
generate, as a set of ordered triggers, a set of pairs of the pre-defined navigation maneuvers and corresponding context information; and
generate route information that identifies a portion of the route between successive pairs of triggers in the set of ordered triggers.

19. The computing system of claim 14, wherein the instructions, when executed, cause the computing system to
render the route information as a set of turn-by-turn navigation instructions.

20. The computing system of claim 19, wherein the natural language input comprises at least one of a textual user input or a speech user input, and the instructions, when executed, cause the computing system to:
render a portion of the natural language input in association with the turn-by-turn navigation instructions.

* * * * *